July 31, 1956  P. M. CRUSE  2,757,259

ELECTRICAL CIRCUIT BREAKER

Filed Aug. 1, 1952

INVENTOR.
PHILIP M. CRUSE
BY Nicholas T Vohr
ATTORNEY.

United States Patent Office 2,757,259
Patented July 31, 1956

2,757,259

ELECTRICAL CIRCUIT BREAKER

Philip Marshall Cruse, Santa Monica, Calif., assignor, by mesne assignments, to Hughes Aircraft Company, a corporation of Delaware Application August 1, 1952, Serial No. 302,096

6 Claims. (Cl. 200—117)

This invention relates to electrical circuit breakers of the character having fusible members, and more particularly to such electrical circuit breakers in which a fusible circuit element is selectively fused for severing another circuit element.

Circuit breakers have long employed the principle of fusing one or more circuit elements in an electrical circuit when current flowing in that circuit has reached an excessive value because of a short circuit or an overload. Such circuit breakers are not suitable for protecting an electrical apparatus which of itself does not pass sufficient current to fuse a fusible member, although the voltage in the circuit may rise to a dangerous value.

The present invention utilizes the fusion of a circuit element in one circuit to interrupt the flow of current in a second circuit. Briefly, the disclosed circuit breaker has a fusible member connected in an auxiliary circuit; when this member is fused by current flowing in the auxiliary circuit, it releases an impact-producing member which severs a second circuit element to open a second circuit.

It is, therefore, an object of the invention to provide a circuit breaker in which a circuit element connected in one circuit is severed by the force of impact in response to the fusion of another circuit element connected in a second circuit.

It is another object to provide a circuit breaker of the above character in which a resilient member operates to sever one circuit element in response to the fusion of a second circuit element.

It is an additional object to provide a circuit breaker of the above character in which the sudden contraction of an extended spring operates to sever a circuit element.

It is also an object to provide such a circuit breaker in which a spring is held in deflected condition for sudden release to sever a circuit element.

The novel features which are believed to be characteristic of the invention, both as to its organization and method of operation, together with further objects and advantages thereof, will be better understood from the following description considered in connection with the accompanying drawing in which an embodiment of the invention is illustrated by way of example. It is to be expressly understood, however, that the drawing is for the purpose of illustration and description only, and is not intended as a definition of the limits of the invention.

Figure 1:
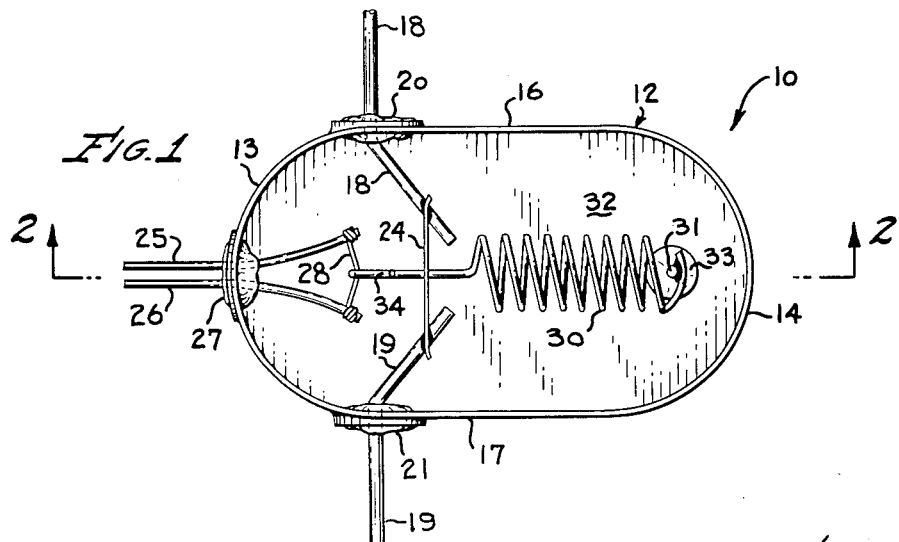
Figure 1 is a plan view of the invention with the cover removed.
Figure 2:
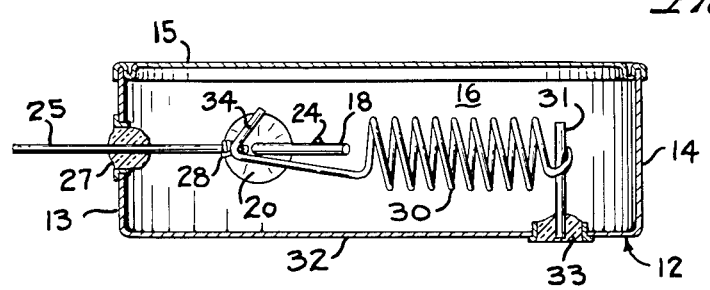
Figure 2 is a cross-sectional view taken on line 2—2 of Figure 1 with the cover added.

Referring to Figures 1 and 2, the circuit breaker 10 includes a housing which comprises a hollow box-like metal body 12 having semicircular end walls 13 and 14, side walls 16 and 17, and a removable metal cover 15. Extending into box-like body 12 through side walls 16 and 17 are terminal elements 18 and 19, respectively, which are supported in and insulated from the walls by their respective insulators 20 and 21. An electric current conductor 24, having physical qualities and proportions for low mechanical strength under conditions of impact, and having its ends respectively soldered to terminal elements 18 and 19, within body 12, provides an interconnecting conductor between these terminals which is easily broken or severed by means hereinafter described.

Extending through semicircular end wall 13 into body 12 is a pair of terminal elements 25 and 26 which are not only insulated from each other but are supported in and insulated from the end wall of the metal body by an insulator 27. A fusible circuit element 28, selected for its ability to fuse when electric current flowing therethrough exceeds a predetermined value, is stretched between and securely soldered to the divergent ends of elements 25 and 26 within body 12.

Figure 3:
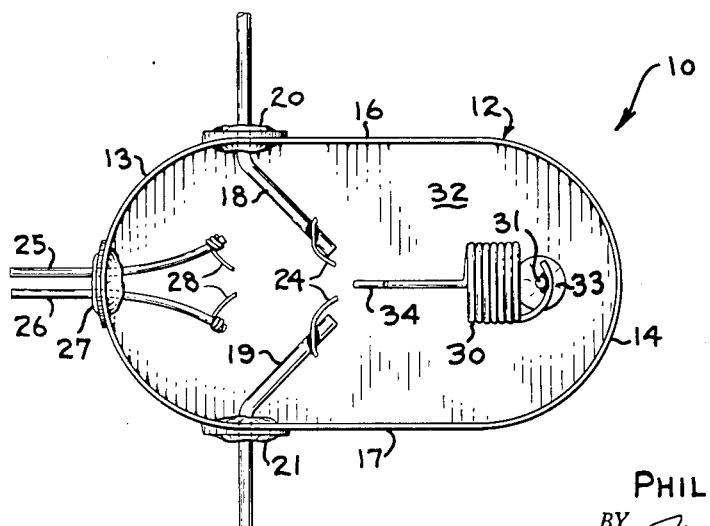
Figure 3 is a view similar to Figure 1 after the circuit breaker has operated.

A resilient member such as a tension spring 30 has one end anchored to metal body 12 by means of a stud 31 fixed to and insulated from the bottom 32 of the body by an insulator 33. The other end of spring 30 is provided with a hook 34 adapted to engage fusible element 28 when the spring is extended in the state of deflection illustrated in Figs. 1 and 2. Element 28 and spring 30 are so positioned with respect to conductor 24 that contraction of the spring to its normal condition, shown in Fig. 3, causes hook 34 to move in a path directly across conductor 24; hence, a sudden release of hook 34 from its engagement with element 28 will cause an impact between the hook and conductor 24. Thus, by providing a spring 30 having sufficient strength, this impact will operate to break or sever the conductor 24, as indicated by Fig. 3. In Fig. 2, it is to be noted that the shank of hook 34 is positioned below conductor 24 to avoid electrical contact with the latter when the circuit breaker is set for operation.

When using circuit breaker 10, terminal elements 18 and 19 are connected in an electrical circuit embracing apparatus to be protected, and terminal elements 25 and 26 are connected in an auxiliary or control circuit; under these conditions, if current in the auxiliary circuit reaches a critical value such as would fuse element 28, then hook 34 is released and spring 30 instantly contracts causing an impact between conductor 24 and hook 34 of sufficient force to instantly sever conductor 24, as illustrated in Fig. 3, and thereby interrupt any flow of current in the circuit embracing terminal elements 18 and 19.

The coils of spring 30 are wound to not only provide the force for severing conductor 24, but they are also wound to provide an initial tension of sufficient magnitude to hold them together so as to provide a condition of rigidity when the spring is contracted as shown in Fig. 3. In view of this condition of rigidity, soldering spring 30 at the point of attachment to stud 31 will hold the contracted spring in a fixed position to resist vibration; moreover, soldering the end of the spring to the stud serves to prevent the spring from becoming loose and causing an unintentional electrical connection between the terminal elements within the housing after the severance of conductor 24.

The structure of circuit breaker 10 is inexpensive to manufacture, and provides for efficient high speed operation unaffected by externally applied forces of acceleration. It is obvious that modifications and alterations of the present invention will occur to one skilled in the art, and it is understood that such changes can be made without the scope of the appended claims.

What is claimed as new is:

1. A circuit breaker fusibly responsive to an electric current above a predetermined value flowing through a first circuit for severing a second circuit, said circuit breaker comprising: a housing; a circuit element fusibly responsive to an electric current flowing therethrough above the predetermined value, and supported within said housing; a severable electric-current conductor supported within said housing in spaced relationship with respect to said circuit element; terminals for connecting said circuit element and said severable conductor in the first and second circuits, respectively; and an impact-producing member coupled to said housing and said circuit element, and transversely associated with said severable conductor such that a fusing condition of the fusible circuit element effects an impact between the severable conductor and the impact-producing members; said conductor and said impact-producing member being so proportioned that the impact effected therebetween causes a severing of said conductor.

2. The circuit breaker defined in claim 1 in which said terminals also constitute means supporting said circuit element and said severable conductor within the housing in a manner such as to provide for the impact between said impact-producing member and said severable conductor.

3. An electric circuit breaker fusibly responsive to an electric current above a predetermined value flowing through a first circuit for severing a second circuit, said circuit breaker comprising: a housing; a circuit element fusibly responsive to an electric current flowing therethrough above the predetermined value; first terminals connected to the ends of the circuit element and adapted to support said circuit element within said housing and to provide means for connecting this element in the first circuit; a severable current conductor; second terminals connected to the ends of said severable conductor and adapted to support said conductor in spaced relationship with respect to said circuit element within said housing and to provide means for connecting this conductor in the second circuit; and an impact-producing spring coupled to said housing and said circuit element, and transversely associated with said severable conductor such that a fusing condition of the fusible circuit element effects an impact between the severable conductor and the spring; said conductor and said impact-producing spring being proportioned with respect to each other such that the impact effected therebetween causes a severing of said conductor.

4. A circuit breaker fusibly responsive to an electric current above a predetermined value flowing through a first circuit for impactively severing a second circuit, said circuit breaker comprising: a metal housing; a circuit element fusibly responsive to an electric current above the predetermined value flowing therethrough; first terminals supporting said circuit element within said housing, said first terminals being insulated from said housing and constituting means for connecting the circuit element in the first circuit; a severable electric-current conductor; second terminals supporting said severable conductor within said housing in spaced relationship with respect to said circuit element, said second terminals being insulated from said housing and constituting means for connecting the severable conductor in the second circuit; and an extended tension spring having one end coupled to said circuit element and the other end fixed to but insulated from said housing, said extended spring being associated with said severable conductor and coupled to the fusible element such that said one end of the spring effects an impact with said conductor when said circuit element fusibly responds to current flowing through the first circuit; said conductor and said spring being so proportioned that the impact effected between the one end of said spring and said conductor causes a severing of the conductor and the second circuit.

5. In an electric circuit breaker having a current responsive fusible circuit element adapted for connection in a first circuit, and means responsive to a fusing condition of the fusible element for impactively severing a second circuit, said means comprising: a severable electric conductor associated in spaced relationship with the fusible element and adapted for connection in the second circuit; and a resilient impact-producing member coupled to the fusible element and transversely positioned in spaced relationship with respect to the severable conductor, said impact-producing member being adapted to impactively sever said severable conductor when current flowing in the first circuit causes a fusible condition of the fusible element.

6. In an electric circuit breaker having a fusible element and means responsive to a fusing condition of the fusible element for impactively severing an electric circuit, said means comprising: a severable electric conductor associated in spaced relationship with the fusible element and adapted for connection in the electric circuit; and an impact-producing spring having a hooked end coupled to the fusible element, said spring being so arranged with respect to the severable conductor that a fusing condition of the fusible element will effect an impact between said hooked end and said severable conductor of sufficient magnitude to sever said conductor.

References Cited in the file of this patent

UNITED STATES PATENTS

| | | |
|---|---|---|
| 262,423 | Irwin | Aug. 8, 1882 |
| 349,613 | Stanley | Sept. 21, 1886 |
| 646,691 | Gharky | Apr. 3, 1900 |
| 800,820 | Rolfe | Oct. 3, 1905 |
| 866,735 | Rolfe | Sept. 24, 1907 |
| 936,923 | Miller | Oct. 12, 1909 |
| 1,626,105 | Sundt | Apr. 26, 1927 |
| 2,275,403 | Bussman | Mar. 10, 1942 |
| 2,354,111 | Gardenhour | July 18, 1944 |
| 2,386,094 | Duerkob | Oct. 2, 1945 |
| 2,459,015 | Clement | Jan. 11, 1949 |